United States Patent
Steben et al.

(10) Patent No.: US 11,451,672 B2
(45) Date of Patent: Sep. 20, 2022

(54) CHARGING AND POLICY INTERFACE FOR LOCAL BREAKOUT EDGE GATEWAY

(71) Applicant: Verizon Patent and Licensing Inc., Basking Ridge, NJ (US)

(72) Inventors: Jerry Steben, Fort Worth, TX (US); Maqbool Chauhan, Keller, TX (US); Parry Cornell Booker, Arlington, TX (US); David Taft, Keller, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/931,923

(22) Filed: May 14, 2020

(65) Prior Publication Data

US 2021/0360110 A1    Nov. 18, 2021

(51) Int. Cl.
*H04W 76/12* (2018.01)
*H04M 15/00* (2006.01)
*H04L 67/02* (2022.01)
*H04L 67/01* (2022.01)

(52) U.S. Cl.
CPC ............ *H04M 15/66* (2013.01); *H04L 67/01* (2022.05); *H04L 67/02* (2013.01); *H04M 15/64* (2013.01); *H04W 76/12* (2018.02)

(58) Field of Classification Search
CPC ..... H04M 15/66; H04M 15/64; H04W 76/12; H04L 67/01; H04L 67/02
USPC ........................................................ 455/406
See application file for complete search history.

(56) References Cited

U.S. PATENT DOCUMENTS

| | | | |
|---|---|---|---|
| 2017/0155734 A1* | 6/2017 | Zhang | G06Q 30/04 |
| 2017/0231020 A1* | 8/2017 | Tomici | H04W 12/069 |
| 2018/0006954 A1* | 1/2018 | Arora | H04M 15/66 |
| 2018/0077294 A1* | 3/2018 | Rasanen | H04M 15/8214 |
| 2018/0359529 A1* | 12/2018 | Hasek | H04N 21/6547 |
| 2019/0116486 A1* | 4/2019 | Kim | H04W 8/10 |

\* cited by examiner

*Primary Examiner* — Joel Ajayi

(57) ABSTRACT

An edge network gateway, located in an edge network and connected to a core network, receives packets for a local breakout (LBO) Protocol Data Unit (PDU) session associated with a mobile subscriber. The edge network gateway sends, based on receipt of the packets for the LBO PDU session, a request for charging to a core network node, and forwards the packets for the LBO PDU session to a network or multi-access edge computing (MEC) data center connected to the edge network. The edge network gateway sends, via an online charging interface, charging data counts for the packets of the LBO PDU session to the core network node for reporting to an Online Charging System and charging to the mobile subscriber.

21 Claims, 7 Drawing Sheets

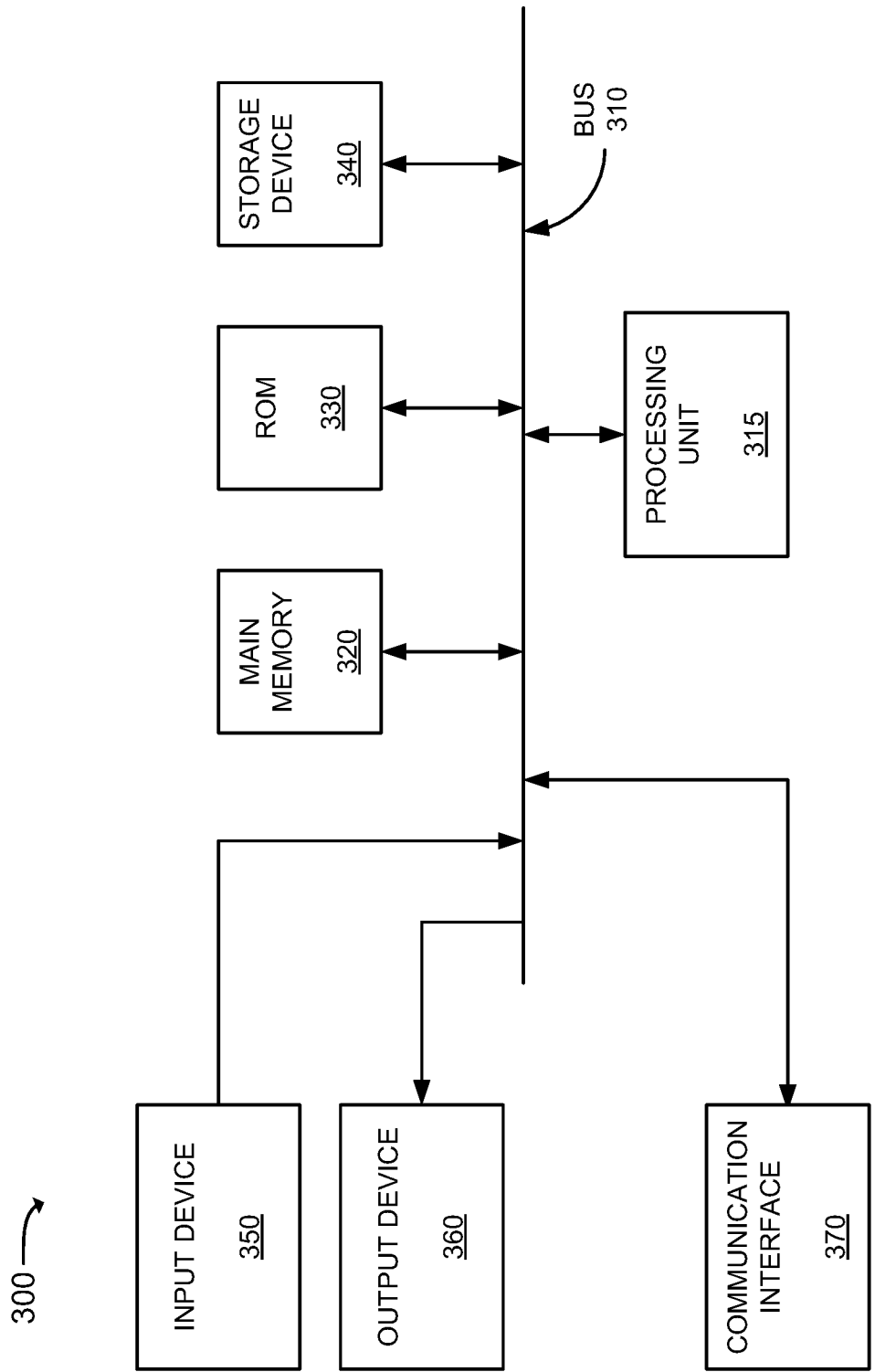

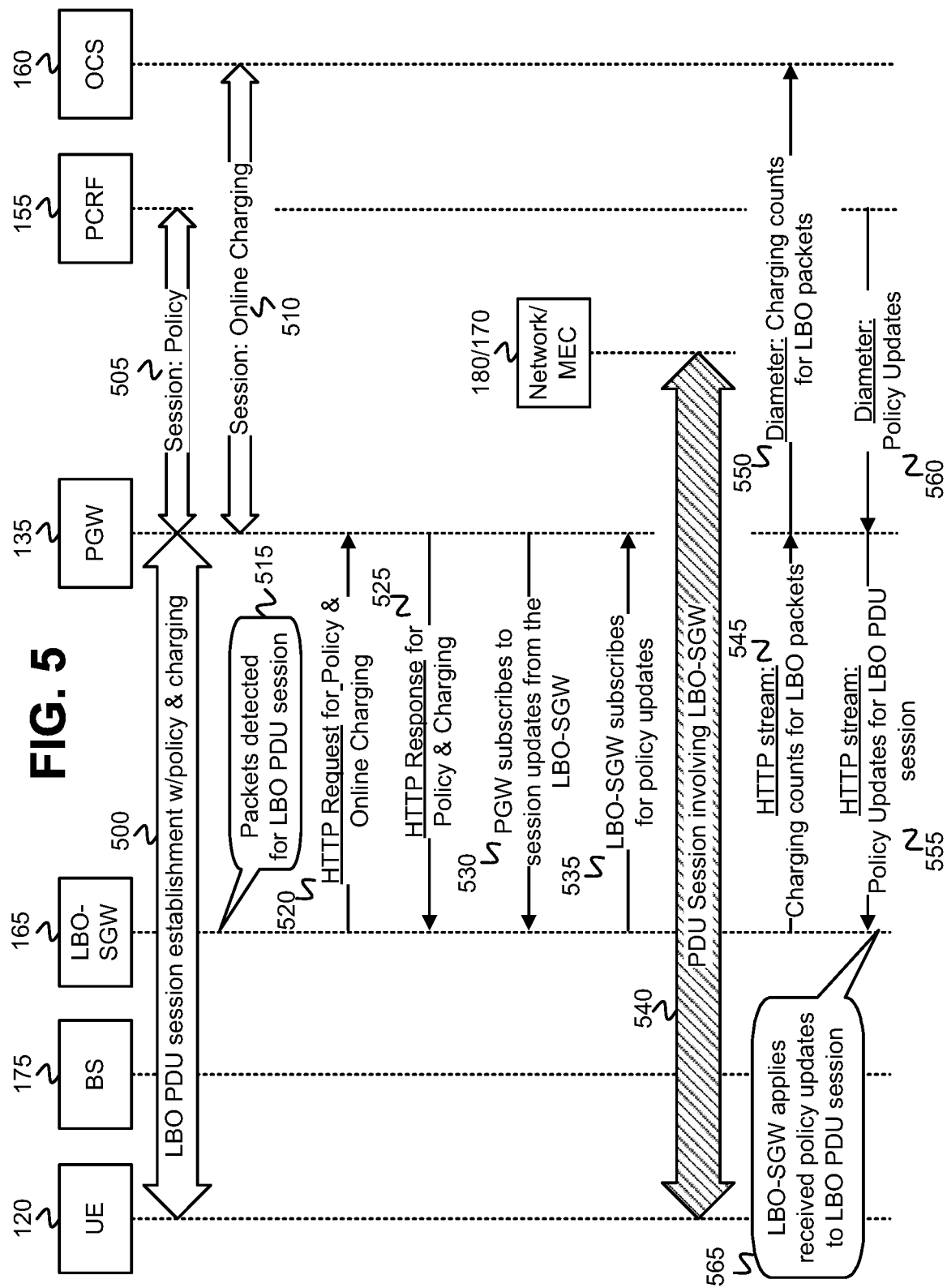

CHARGING AND POLICY INTERFACE FOR LOCAL BREAKOUT EDGE GATEWAY

BACKGROUND

Edge computing may involve a cloud-based Information Technology (IT) service environment located at an edge of a network. One of the purposes of edge computing is to enable high-bandwidth, low-latency access to latency-sensitive applications distributed at the edge of the network closest to the user. A primary goal of edge computing is to reduce network congestion and improve application performance by executing task processing closer to end users, thereby improving the delivery of content and applications to the end users and reducing transport costs for high bandwidth services. Applications where edge computing is highly desirable may include on-line gaming, augmented reality (AR), virtual reality (VR), wirelessly connected vehicles, and Internet of Things (IoT) applications (e.g., industry 4.0 applications). Additionally, edge computing can be beneficial in large public venues and enterprise organizations where venue or enterprise services are delivered to onsite consumers from an edge server located at or near the venue or organization. In such large-scale use cases, data content may be locally produced, stored, processed, and/or delivered from an edge server, thus, ensuring reduced backhaul, low latency, or even ultra-low latency. Multi-Access Edge Computing (MEC) is one type of edge computing. MEC moves the processing, storing, and/or delivery of traffic and services from a centralized network to a data center(s) at the edge of the network, closer to the end user.

BRIEF DESCRIPTION OF THE DRAWINGS

FIG. 3 is a diagram of exemplary components of a network device that may correspond to devices/functions of the network environment of FIG. 1;

FIG. 5 is an exemplary messaging diagram associated with the process of FIGS. 4A and 4B.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

"Local breakout" (LBO) involves moving traffic from a core network to a local breakout network, such as an edge network, that is closer to device users. A LBO provides access to the Internet, and/or other networks or to an MEC data center, at a LBO gateway that is closer to the user and, thus, avoids transport of traffic through the core network. LBO, therefore, reduces a volume of traffic on the core network and may reduce end-to-end latency.

In a mobile network environment, it may be desirable to implement local breakout (LBO) at an edge network for Protocol Data Unit (PDU) sessions involving user equipment devices. This LBO of user equipment device traffic at the edge network can reduce end-to-end latency of the PDU sessions and reduce traffic load on the mobile core network. An edge network gateway (or other edge node), such as a serving gateway (SGW), may implement the LBO of the PDU sessions with the user equipment devices. The edge network gateway (e.g., LBO-SGW) may route and forward the PDU session traffic between the user equipment device and a MEC data center or a local network connected to the edge network. Existing mobile network protocols do not currently define interfaces for conveying online charging information from the edge network gateway or node to the core network, or for receiving dynamic policy updates from the core network at the edge network gateway or node.

Exemplary embodiments described herein introduce a bi-directional interface between an edge network gateway or node (e.g., the LBO-SGW) and a node in the core network (e.g., a Packet data network Gateway (PGW)) that enables the edge network gateway to send online charging information to the core network node for sending to the Online Charging System (OCS). Additionally, the bi-directional interface enables the core network node to obtain dynamic policy updates from the Policy and Charging Rules Function (PCRF) and send the policy updates to the edge network gateway or node (e.g., LBO-SGW) for application of the policy updates to the LBO PDU sessions.

Figure 1:
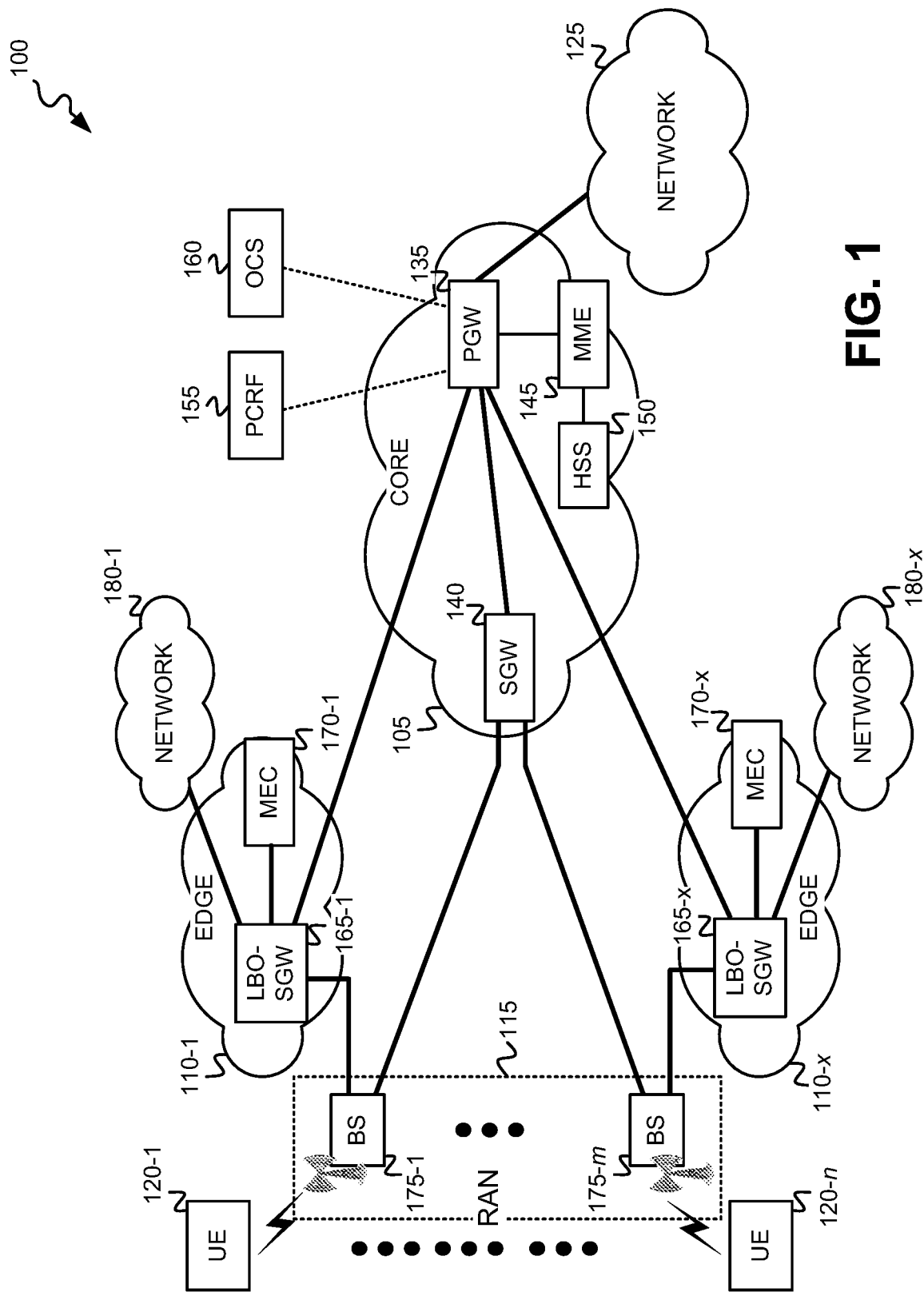
FIG. 1 illustrates an exemplary mobile network environment in which a local breakout of data traffic is implemented by an edge network connected to a core network.

FIG. 1 illustrates an exemplary mobile network environment 100 in which a local breakout (LBO) of data traffic is implemented at an edge network(s) connected to a core network. Network environment 100 includes a core network 105, edge networks 110-1 through 110-x, a radio access network (RAN) 115, user equipment devices (UEs) 120-1 through 120-n, and network 125. The exemplary mobile network environment 100 of FIG. 1 depicts an example of a Fourth Generation (4G) mobile network. However, the LBO of data traffic at edge networks described herein may be applied to other types of mobile networks, such as, for example, Fifth Generation (5G) mobile networks. The LBO of data traffic at edge networks described herein may also be applied to mobile networks in which 4G core network components interwork with 5G core network components. In such cases of 4G/5G interworking, the 5G Session Management Function (SMF) may, for example, operate to interconnect the 4G PGW with the LBO-SGW to enable the LBO of data traffic at the edge network.

Core network 105 includes the core components of a wireless network that serves to provide wireless access to UEs 120-1 through 120-n. The wireless network may include any type of wireless network, such as, for example, a Public Land Mobile Network (PLMN), which provides wireless access and connectivity to the UEs 120. Core network 105 includes the core components for routing and transporting data to and from UEs 120-1 through 120-n via RAN 115. In the embodiment shown in FIG. 1, core network 105 includes a Packet Gateway (PGW) 135, a Serving Gateway (SGW) 140, a Mobility Management Entity (MME) 145, and a Home Subscriber Server (HSS) 150. In other types of mobile networks (not shown), the core network 105 may include different functions than those shown. For example, in a 5G mobile network environment, core network 105 may instead include a User Plane Function (UPF), an Access & Mobility Function (AMF), a Session Management Function (SMF), and a User Data Management (UDM) function.

PGW 135 includes a network device that acts as a gateway between network 125 and core network 105, and between core network 105 and edge networks 110-1 through 110-x. PGW 135 routes and forwards session data from network 125 towards SGW 140 in core network 105 or from network 125 towards a LBO-SGW 165 in an edge network 110. PGW 135 additionally routes and forwards session data from a UE 120 to network 125. SGW 140 includes a network device that routes and forwards session data between PGW 135 and components of RAN 115 serving the session's destination UE 120.

MME 145 includes a network device that acts as a control entity for core network 105. MME function may include communicating with HSS 150 for user/device authentication and for user/device profile download. MME 145 further provides UEs 120 with mobility management and session management functions using, for example, Non-Access Stratum (NAS) signaling. HSS 150 includes a user database (DB) that stores user subscription-related information (e.g., subscriber profiles), and performs authentication and authorization of the user.

Edge networks 110-1 through 110-x (generically referred to herein as "edge network 110" or "edge networks 110") each includes one or more edge computing data centers, or other edge devices, that enable the movement of traffic and network services from core network 105 towards the edge of network environment 100 and closer to UEs 120. Instead of sending data to core network 105 for processing, routing, and transport, edge network 110 handles the data closer to the destination UEs 120, thereby reducing latency. Each of edge networks 110-1 through 110-x may connect to a respective network 180-1 through 180-x (generically referred to herein as "network 180" or "networks 180") in addition to connecting to core network 105.

Edge network 110-1 may include a local breakout (LBO) SGW (LBO-SGW) 165-1, and a Multi-Access Edge Computing (MEC) data center 170-1. Edge network 110-1 and LBO-SGW 165-1 may be located in close proximity to a locally-attached UE 120 and to components of RAN 115 serving the UE 120. LBO-SGW 165-1 includes a network device that routes and forwards session data between PGW 135 and components of RAN 115 serving the UE 120. LBO-SGW 165-1 additionally routes and forwards session data from a UE 120 to MEC 170-1 or network 180-1. MEC 170-1 includes a data center that may be located in close proximity to, and be connected to, LBO-SGW 165-1.

Edge network 110-x may include a LBO-SGW 165-x and a MEC data center 170-x. Edge network 110-x and LBO-SGW 165-x may be located in close proximity to a UE 120 and to components of RAN 115 that serve the UE 120. LBO-SGW 165-x includes a network device that routes and forwards session data between PGW 135 and components of RAN 115 serving the UE 120. LBO-SGW 165-x additionally routes and forwards session data from a UE 120 to MEC 170-x or network 180-x. MEC 170-x includes a data center that may be located in close proximity to, and be connected to, LBO-SGW 165-x.

RAN 115 may include multiple radio access network components such as, for example, base stations 175-1 through 175-m. Base stations 175-1 through 175-m each includes a transceiver system that connects UEs 120 to other components of network 110 and network 105 using wireless interfaces. Each of base stations 175 may include an antenna array, transceiver circuitry, and other hardware and software components for enabling UEs 120 to wirelessly transmit data to a respective base station 175, and to wirelessly receive data from a respective base station 175. Each base station 175 connects to other components of networks 110 and 105 such that data received from a source UE 120 may be forwarded towards its destination in networks 110 or 105, or data received from networks 110 or 105 may be forwarded to a destination UE 120. In one implementation, each of base stations 175 may include an evolved NodeB (eNB).

UEs 120-1 through 120-n may each include any type of computational device that includes components for wirelessly communicating via RAN 115. UEs 120 may each include, for example, a computer (e.g., desktop, laptop, tablet, or wearable computer), a cellular phone (e.g., a "smart" phone), a Voice over Internet Protocol (VoIP) phone, a smart Television (TV), an audio speaker (e.g., a "smart" speaker), a video gaming device, a music player (e.g., a digital audio player), a digital camera, a set-top box (STB), or a "Machine-to-Machine" (M2M) or "Internet of Things" (IoT) device. A "user" (not shown) may own, operate, administer, and/or carry each UE 120.

Networks 180-1 through 180-x (generically referred to herein as "network 180" or "networks 180") may include any type of network that can connect with a respective edge network 110. In one implementation, networks 180-1 through 180-x include a local area network (LAN), wide area network (WAN), or a metropolitan area network (MAN). In some implementations, networks 180-1 through 180-x may be a same network as network 125 (e.g., edge networks 110-1 through 110-x all connected to a same network). For example, network 125 and networks 180 may be a public network, such as the Internet.

Network 125 may include any type of network that can connect to core network 105 for transporting data between core network 105 and nodes or devices that are external to core network 105 and are connected to network 125. Network 125 may include, for example, the Internet, a local area network(s) (LAN), a wide area network(s) (WAN), or a metropolitan area network (MAN). Network 125 may, however, include other types of networks.

Though only a single instance of each network function (e.g., PGW 135, SGW 140, MME 145) is shown as residing in core network 105, network 105 may include multiple instances of certain ones of network functions 135-160. For example, core network 105 may include multiple instances of SGW 140 and/or PGW 135 that may reside at various locations in core network 105.

The configuration of network components of network environment 100 shown in FIG. 1 is for illustrative purposes. Other configurations may be implemented. Therefore, network environment 100 may include additional, fewer and/or different components that may be configured in a different arrangement than that depicted in FIG. 1.

Figure 2A:
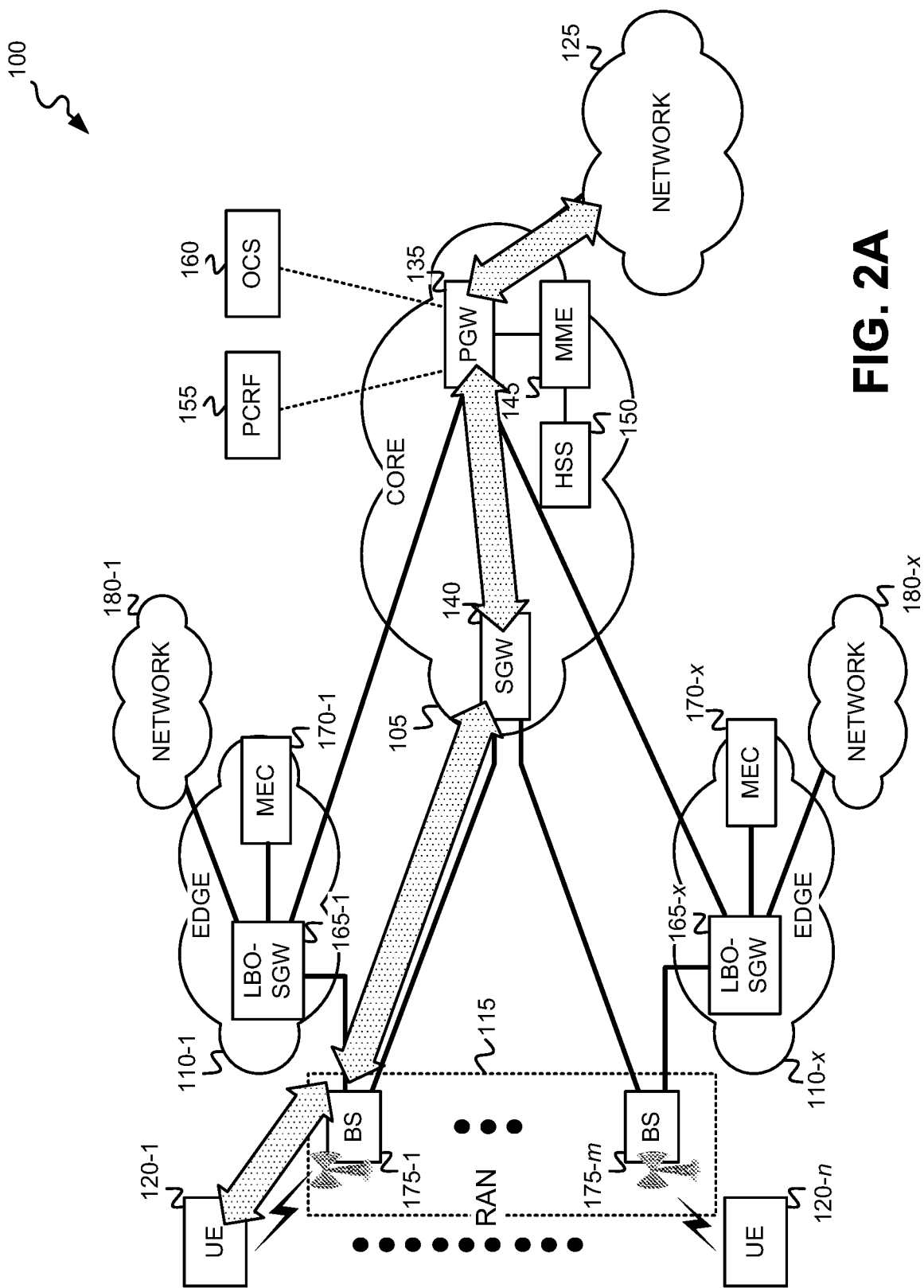
FIG. 2A depicts the network environment of FIG. 1 when a user equipment device (UE) engages in a Protocol Data Unit (PDU) session via the Radio Access Network and the core network.

FIG. 2A depicts the network environment 100 of FIG. 1 in circumstances where a UE 120 engages in a PDU session with a node in network 125 via RAN 115 and core network 105. In the circumstances shown in FIG. 2A, devices/functions in the core network 105 and RAN 115 are used for transporting data of the PDU session to and from the UE 120 and the node in the network 125.

Packet data of the PDU session sent from UE 120-1 towards a session endpoint in network 125 is first wirelessly transmitted by UE 120-1 to BS 175-1 of RAN 115. BS 175-1 then forwards the packet data to SGW 140 in core network 105 and SGW 140, in turn, routes and forwards the packet data to PGW 135. PGW 135, upon receipt of the packet data for the PDU session, routes and forwards the packet data to network 125 for transport to the session endpoint (not shown).

Packet data of the PDU session sent from the session endpoint in network 125 (e.g., a server) towards UE 120-1 is sent from the session endpoint across network 125 to PGW 135 in core network 105. PGW 135 routes and forwards the packet data to SGW 140 which, in turn, routes and forwards the packet data to BS 175-1 of RAN 115. BS 175-1 wirelessly transmits the packet data to the UE 120-1. In the circumstances shown in FIG. 2A, data packets of the PDU session traverse the RAN 115, core network 105, and network 125 before reaching either of the session endpoints of the PDU session.

Figure 2B:
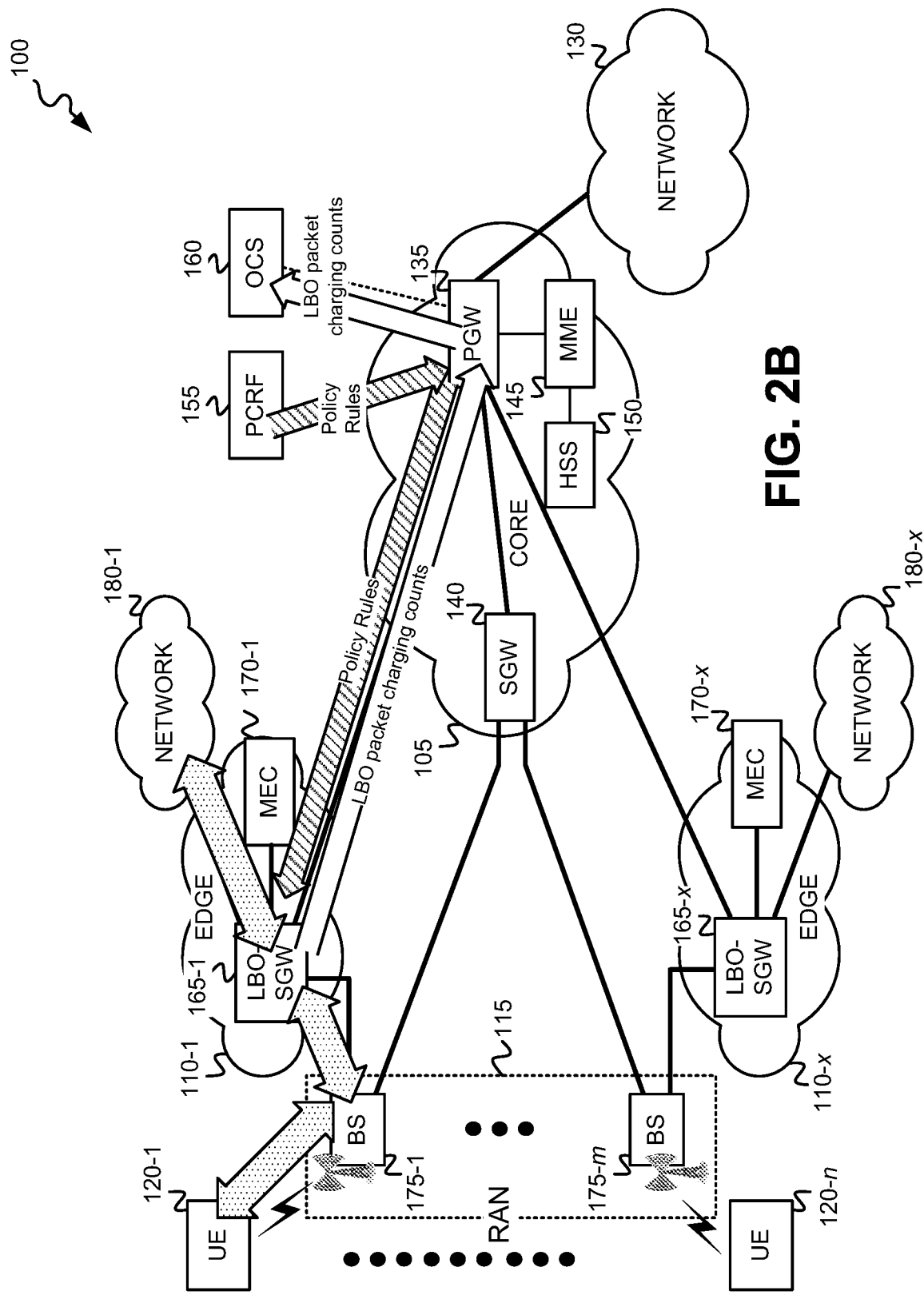
FIG. 2B depicts the network environment of FIG. 1 when a UE engages in a PDU session via an edge network and a local breakout Serving Gateway.

FIG. 2B depicts the network environment 100 of FIG. 1 in circumstances where a UE 120 engages in a PDU session with a session endpoint in network 180-1 or with MEC 170-1 via a edge network 110 and a LBO-SGW 165. In the circumstances shown in FIG. 2B, a LBO-SGW in an edge network 110, instead of a SGW 140 in core network 105, is used for transporting the PDU session traffic to a session endpoint in network 180 or to a MEC 170.

Packet data of the PDU session sent from UE 120-1 towards a session endpoint in network 180-1 is first wirelessly transmitted by UE 120-1 to BS 175-1 of RAN 115. BS 175-1 forwards the packet data to LBO-SGW 165-1 in edge network 110-1 and LBO-SGW 165-1, in turn, then routes and forwards the packet data to network 180-1 for transport to a session endpoint. Alternatively, LBO-SGW 165-1 may instead route and forward the packet data to MEC 170-1.

Packet data of the PDU session sent from the session destination in network 180-1 (e.g., a server) towards UE 120-1 is sent across network 180-1 and to LBO-SGW 165-1 in edge network 110-1. Alternatively, the PDU session traffic sent from MEC 170-1 towards UE 120-1 is sent to LBO-SGW 165-1 in edge network 110-1. Upon receipt of packet data of the PDU session, LBO-SGW 165-1 routes and forwards the packet data to BS 175-1. BS 175-1 wireless transmits the received data packets for the PDU session to UE 120-1. In the circumstances shown in FIG. 2BA, data packets of the PDU session traverse RAN 115 and edge network 110 before reaching either of the destination endpoints of the PDU session.

FIG. 3 is a diagram of exemplary components of a network device 300. UEs 120, LBO-SGWs 165, MECs 170, SGW 140, PGW 135, HSS 150, MME 145, PCRF 155, and OCS 160 may each include the same, or similar components, as network device 300 shown in FIG. 3. Network device 300 may include a bus 310, a processing unit 315, a main memory 320, a read only memory (ROM) 330, a storage device 340, an input device 350, an output device 360, and a communication interface(s) 370.

Bus 310 may include a path that permits communication among the elements of network device 300. Processing unit 315 may include one or more processors or microprocessors which may interpret and execute stored instructions associated with one or more processes, or processing logic that implements the one or more processes. For example, processing unit 315 may include, but is not limited to, programmable logic such as Field Programmable Gate Arrays (FPGAs) or accelerators. Processing unit 315 may include software, hardware, or a combination of software and hardware for executing the processes described herein. Main memory 320 may include a random access memory (RAM) or another type of dynamic storage device that may store information and, in some implementations, instructions for execution by processing unit 315. ROM 330 may include a Read Only Memory (ROM) device or another type of static storage device (e.g., Electrically Erasable Programmable ROM (EEPROM)) that may store static information and, in some implementations, instructions for use by processing unit 315. Storage device 340 may include a magnetic and/or optical recording medium and its corresponding drive. Main memory 320, ROM 330 and storage device 340 may each be referred to herein as a "non-transitory computer-readable medium" or a "non-transitory storage medium."

Input device 350 may include devices that permit a user or operator to input information to network device 300, such as, for example, a keypad or a keyboard, a display with a touch sensitive panel, voice recognition and/or biometric mechanisms, etc. Output device 360 may include devices that output information to the operator or user, including a display, a speaker, etc. Input device 360 and output device 360 may, in some implementations, be implemented as a graphical user interface (GUI) that displays GUI information, and which receives user input via the GUI. In some implementations, such as when LBO-SGWs 165, SGW 140, PGW 135, HSS 150 and MME 145 are implemented by one or more network devices 300, input device 350 and/or output device 360 may be omitted from network device(s) 300.

Communication interface(s) 370 may include transceivers that enable network device 300 to communicate with other devices and/or systems. For example, in the case where network device 300 is a UE 120, communication interface(s) 370 may include a wireless transceiver (including at least one antenna) for communicating with BSs 175 of RAN 115. In the cases of LBO-SGWs 165, MECs 170, SGW 140, PGW 135, HSS 150, or MME 145 being implemented by a network device 300, communication interface(s) 370 may include at least one wired transceiver for wired communication via core network 105.

Network device 300 may perform certain operations or processes, as may be described herein. Network device 300 may perform these operations in response to processing unit 315 executing software instructions contained in a computer-readable storage medium, such as memory 320. A computer-readable storage medium may be defined as a physical or logical memory device. A logical memory device may include memory space within a single physical memory device or spread across multiple physical memory devices. The software instructions may be read into main memory 320 from another computer-readable storage medium, such as storage device 340, or from another device via communication interface(s) 370. The software instructions contained in main memory 320 may cause processing unit 315 to perform the operations or processes, as described herein. Alternatively, hardwired circuitry (e.g., logic hardware) may be used in place of, or in combination with, software instructions to implement the operations or processes, as described herein. Thus, exemplary implementations are not limited to any specific combination of hardware circuitry and software.

The configuration of components of network device 300 illustrated in FIG. 3 is for illustrative purposes. Other configurations may be implemented. Therefore, network device 300 may include additional, fewer and/or different components, arranged in a different configuration, than depicted in FIG. 3.

Figure 4A:
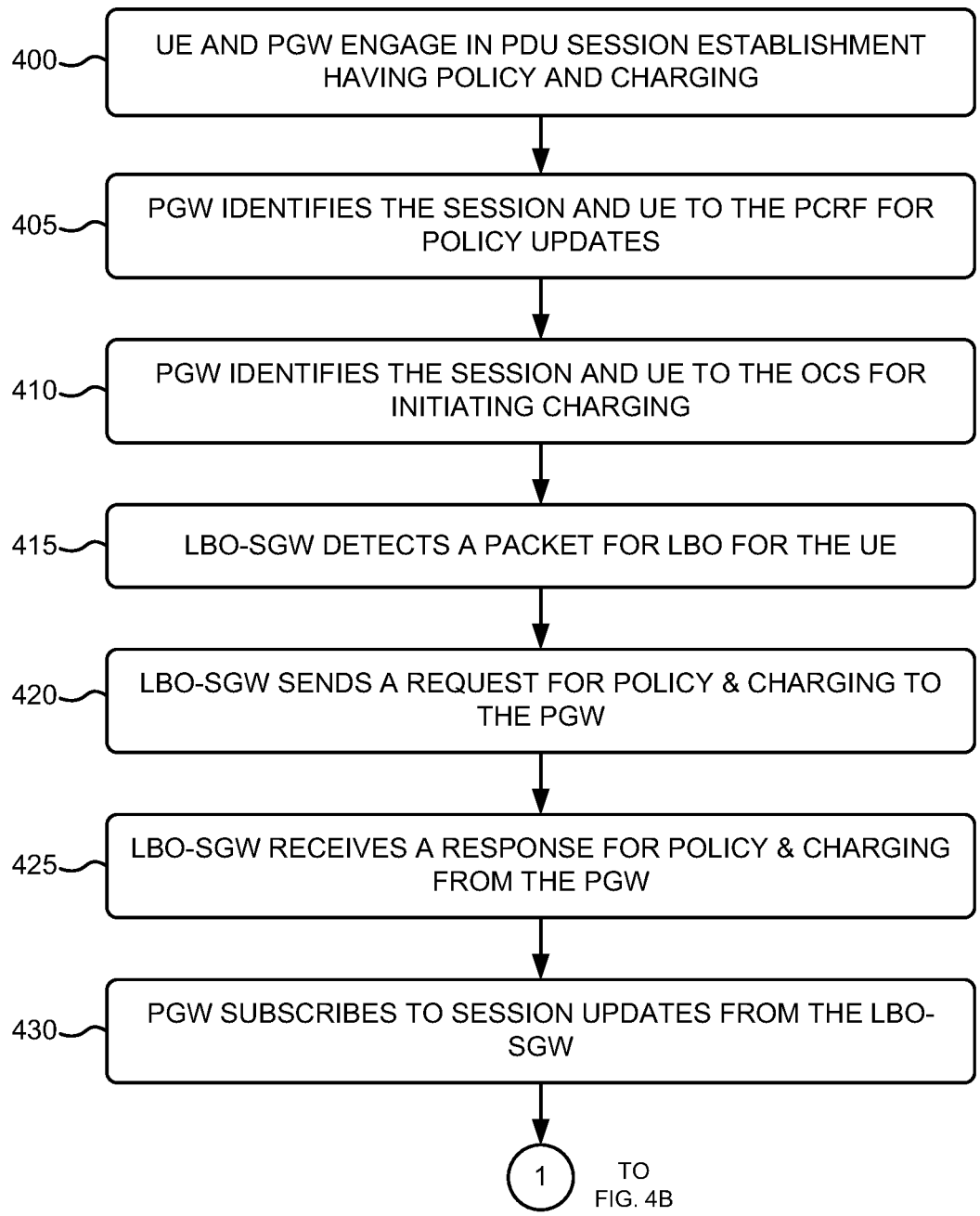
FIGS. 4A and 4B are flow diagrams of an exemplary process for implementing a local breakout of a PDU session in an embodiment described herein.
Figure 4B:
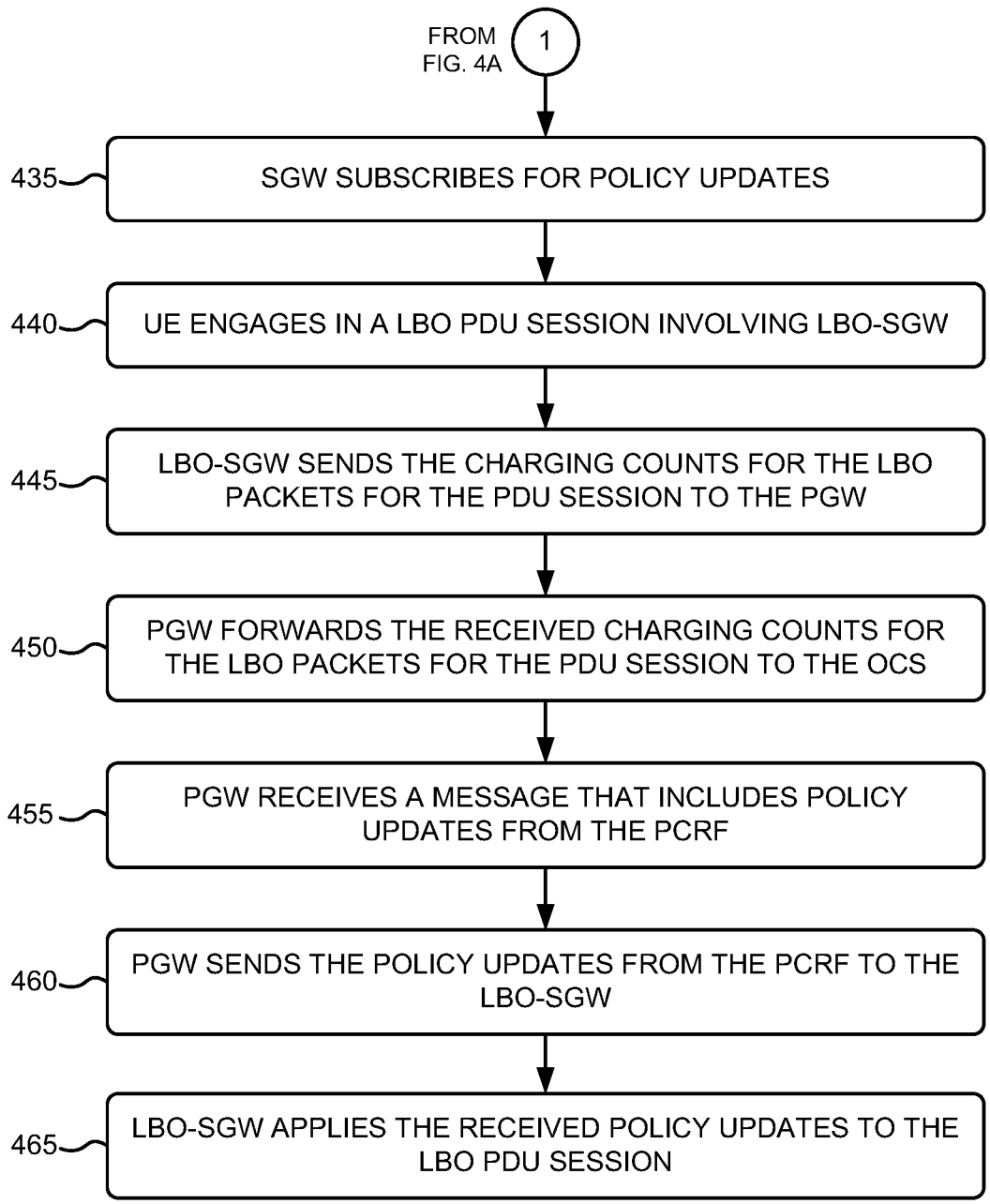

FIGS. 4A and 4B are flow diagrams of an exemplary process for implementing a LBO of a PDU session involving a UE 120 and a MEC 170 or a session endpoint in networks 125 or 180. The exemplary process of FIGS. 4A and 4B may be implemented by various cooperating nodes in RAN 115, edge networks 110, and core network 105. For example, the process of FIGS. 4A and 4B may be implemented by cooperative communication and action among UE 120, a BS 175 of RAN 115, a LBO-SGW 165 of an edge network 110, and a PGW 135 of core network 105.

The exemplary process may include a UE 120 and PGW 135 engaging in LBO PDU session establishment having policy and charging (block 400). The UE 120 may attempt to establish a PDU session with a session endpoint in network 180, or a MEC 170 in edge network 110, by first engaging in PDU session establishment with PGW 135 in core network 105. During session establishment, MME 145, in communication with PGW 135, may assign a particular Access Point Name (APN) to the session, and may select LBO-SGW 165 for the assigned APN. FIG. 5 shows UE 120 engaging in PDU session establishment 500 with PGW 135 via BS 175 and LBO-SGW 165, with the session establishment process including requesting policy updates and online charging.

PGW 135 identifies the session and the UE 120 to the PCRF 155 for receiving policy updates (block 405) and identifies the session and the UE 120 to the OCS 160 for initiating charging for UE 120 (block 410). To enable application of policy updates to the LBO PDU session, the session and UE 120 need to be identified to the PCRF 155 to enable the receipt of policy updates. Additionally, to enable on-line charging of the LBO PDU session, whose packets transit edge network 110 and not core network 105, the session and UE 120 need to be identified to the OCS 160 to initiate the on-line charging. As shown in FIG. 5, in response to the PDU session establishment 500, PGW 135 sends a notification 505 to PCRF 155 that identifies the session and the UE 120 to PCRF 155 for subsequently receiving policy updates. Additionally, PGW 135 sends a notification 510 to OCS 160 that identifies the session and the UE 120 to OCS 160 for initiation of online charging to a customer account associated with the UE 120.

LBO-SGW 165 detects the receipt of a packet(s) for the LBO PDU session involving the UE 120 (block 415). Subsequent to establishment of the LBO PDU session, UE 120 may begin sending packets for the session to BS 175 and to LBO-SGW 165. FIG. 5 depicts LBO-SGW 165 detecting 515 the receipt of initial packets for the established LBO PDU session between UE 120 and PGW 135.

LBO-SGW 165 sends a request for policy and charging to the PGW 135 (block 420) and LBO-SGW 165 receives a response for policy and charging from the PGW 135 (block 425). In one implementation, the request for policy and charging may include a HyperText Transfer Protocol (HTTP) request and the response may include a HTTP response. Upon receipt of the policy and charging request from LBO-SGW 165, PGW 135 verifies the UE 120 associated with the established PDU session and that PGW 135 previously identified the UE 120 and PDU session to PCRF 155 and OCS 160. In this implementation, the HTTP request and HTTP response establish a client/server relationship between LBO-SGW 165 and PGW 135, where LBO-SGW 165 acts as the HTTP client and PGW 135 acts as the HTTP server with respect to the exchange of policy and charging information. FIG. 5 shows LBO-SGW 165 sending a HTTP request 520 for policy and online charging to PGW 135, and PGW 135, in response, returning a HTTP response 525 for policy and charging to LBO-SGW 165.

PGW 135 subscribes to session updates from the LBO-SGW 165 (block 430). Due to mobility events involving the UE 120 associated with the session, the LBO-SGW 165 may no longer be the SGW serving the UE 120. In such an event, a session update from LBO-SGW 165 makes PGW 135 aware that it will no longer receive charging counts for LBO packets via the online charging interface (e.g., in block 445 below). FIG. 5 shows PGW 135 sending a subscription request 530 to LBO-SGW 165 to receive PDU session updates from LBO-SGW 165.

LBO-SGW 165 subscribes for policy updates to the PGW 135 (block 435). LBO-SGW 165 subscribes to policy updates to initiate PGW 135 sending of policy rule updates, that PGW 135 receives from PCRF 155, to LBO-SGW 165. Upon receipt of a policy rule update from PCRF 155, PGW 135 translates the content of the policy rule update, such as from Diameter to Javascript Object Notation (JSON), and forwards the translated policy update to LBO-SGW 165 via a HTTP stream (as described in blocks 455 and 460 below). FIG. 5 depicts LBO-SGW 165 sending a subscription request 535 to PGW 135 to receive policy updates from PCRF 155 via PGW 135.

UE 120 engages in a LBO PDU session involving the LBO-SGW 165 (block 440). The LBO PDU session may include packets of the session being transmitted from UE 120 to BS 175, and then transported from BS 175 to LBO-SGW 165, and across edge network 110 to a MEC 170 or to a destination in network 180. The LBO PDU session, therefore, transits only edge network 110 and avoids transport through core network 105. FIG. 5 shows UE 120 engaging in the PDU session, involving the LBO-SGW 165 and BS 175, with a network 180 or MEC 170.

LBO-SGW 165 sends the charging counts for the LBO packets for the PDU session to the PGW 135 (block 445), and PGW 135 forwards the received charging counts for the PDU session LBO packets to the OCS 160 (block 450). Upon receipt of the on-line charging counts for the LBO PDU session from LBO-SGW 165, OCS 160 updates the current on-line charging totals of the subscriber account associated with the UE 120 involved in the LBO PDU session. FIG. 5 depicts LBO-SGW 165 sending an HTTP stream 545 that includes charging counts for the LBO packets for the PDU session, and PGW 135 sending a Diameter message 550 that includes the charging counts for the LBO packets to OCS 160.

PGW 135 receives a message that includes policy updates from the PCRF 155 (block 455), and PGW 135 sends the policy updates to the LBO-SGW 165 (block 460). In response to the identification of the PDU session and UE 120 in block 405, PCRF 155 retrieves current policy rules for the PDU session and UE 120 from memory and sends a message that includes the current policy rules as policy updates to LBO-SGW 165. FIG. 5 depicts PCRF 155 sending a Diameter message 560 that includes policy updates to PGW 135, and PGW 135 sending a HTTP stream 555 to the LBO-SGW 165 that includes the policy updates for the LBO PDU session involving the UE 120.

LBO-SGW 165 applies the received policy updates to the LBO PDU session (block 465). Upon receipt of the message with the policy updates from PGW 135, LBO-SGW 165 extracts the policy updates and stores, in memory, the policy updates in association with an identification of the UE 120 and PDU session. LBO-SGW 165 subsequently applies the policy rules contained in the policy updates to packets that are received for the PDU session between the UE 120 and the network 180 or MEC 170. FIG. 5 shows LBO-SGW 165 applying 565 the received policy updates to the LBO PDU session.

The exemplary process of FIGS. 4A and 4B may be repeated for the establishment and conduct of each LBO PDU session involving a UE 120 and a SGW 165 at an edge network 110. A LBO-SGW 165 may, thus, be engaged in multiple instances of the process of FIGS. 4A and 4B involving multiple different UEs 120.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIGS. 4A and 4B, the order of the blocks may be varied in other implementations.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 315) of a device. A non-transitory storage medium includes one or more of the storage mediums described in relation to memory/storage 320. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for." In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by an edge network local breakout (LBO) serving gateway (LBO-SGW) from a Radio Access Network (RAN) via an edge network in which the edge network LBO-SGW resides, packets for a LBO Protocol Data Unit (PDU) session associated with a mobile subscriber, wherein the edge network LBO-SGW, via the edge network, connects to a mobile core network, the RAN, at least one multi-access edge computing (MEC) data center, and a first network comprising at least one of a local area network, a wide area network, a metropolitan area network or a public network;
sending, by the edge network LBO-SGW based on receipt of the packets for the LBO PDU session, a request for charging via the edge network and through the mobile core network to a Packet data network Gateway (PGW) of the mobile core network;
routing and forwarding, by the edge network LBO-SGW, the packets for the LBO PDU session via the edge network to a selected one of the first network or the at least one MEC data center without transporting the packets for the LBO PDU session through the mobile core network; and
sending, by the edge network LBO-SGW, charging data counts, for the packets of the LBO PDU session routed and forwarded by the edge network LBO-SGW, via the edge network and through the mobile core network to the PGW for reporting to an Online Charging System (OCS) and charging to the mobile subscriber.

2. The method of claim 1, further comprising:
establishing, by the edge network LBO-SGW, the LBO PDU session with the PGW, wherein the LBO PDU session includes policy updates and online charging.

3. The method of claim 1, further comprising:
sending, by the edge network LBO-SGW, a subscription request to the PGW for receiving policy updates for the LBO PDU session from a Policy and Charging Rules Function (PCRF).

4. The method of claim 3, further comprising:
receiving, by the edge network LBO-SGW from the PCRF via the PGW and in response to the subscription request, policy updates for the LBO PDU session; and
applying, by the edge network LBO-SGW, the received policy updates to the LBO PDU session.

5. The method of claim 1, further comprising:
establishing, between the edge network LBO-SGW and the PGW, a HyperText Transfer Protocol (HTTP) client/server relationship.

6. The method of claim 5, wherein sending the charging data counts to the PGW comprises:
sending, from the edge network LBO-SGW to the PGW, an HTTP stream that includes the charging data counts for the packets of the LBO PDU session.

7. The method of claim 5, further comprising:
sending, by the edge network LBO-SGW, a subscription request to the PGW for receiving policy updates for the LBO PDU session; and receiving, from the PGW in response to the subscription request, an HTTP stream that includes policy updates for application, by the edge network LBO-SGW, to the LBO PDU session.

8. An edge network local breakout (LBO) serving gateway (LBO-SGW), comprising:
a communication interface comprising a transceiver configured to transmit and receive data via an edge network in which the edge network LBO-SGW resides; and
one or more processors configured to:
receive, from a Radio Access Network (RAN) via the communication interface, packets for a LBO Protocol Data Unit (PDU) session associated with a mobile subscriber, wherein the edge network LBO-SGW, via the edge network, connects to a mobile core network, the RAN, at least one multi-access edge computing (MEC) data center, and a first network comprising at least one of a local area network, a wide area network, a metropolitan area network or a public network;
send, via the communication interface based on receipt of the packets for the LBO PDU session, a request for charging via the edge network and through the mobile core network to a Packet data network Gateway (PGW) of the mobile core network;
route and forward the packets for the LBO PDU session via the edge network to a selected one of the first network or the at least one MEC data center without transporting the packets for the LBO PDU session through the mobile core network; and
send charging data counts, for the packets of the LBO PDU session routed and forwarded by the edge network LBO-SGW, via the edge network through the mobile core network to the PGW for reporting to an Online Charging System (OCS) and charging to the mobile subscriber.

9. The edge network LBO-SGW of claim 8, wherein the one or more processors, or logic, is further configured to:
establish, by the edge network LBO-SGW, the LBO PDU session with the PGW, wherein the LBO PDU session includes policy updates and online charging.

10. The edge network LBO-SGW of claim 8, wherein the one or more processors, or logic, is further configured to:
send, via the communication interface, a subscription request to the PGW for receiving policy updates for the LBO PDU session from a Policy and Charging Rules Function (PCRF).

11. The edge network gateway of claim 10, wherein the one or more processors, or logic, is further configured to:
receive, from the PCRF via the PGW in response to the subscription request, policy updates for the LBO PDU session; and
apply the received policy updates to the LBO PDU session.

12. The edge network LBO-SGW of claim 8, wherein the one or more processors, or logic, is further configured to:
establish, between the edge network LBO-SGW and the PGW, a HyperText Transfer Protocol (HTTP) client/server relationship.

13. The edge network LBO-SGW of claim 12, wherein, when sending the charging data counts to the PGW, the one or more processors, or logic, is further configured to:
send, to the PGW, an HTTP stream that includes the charging data counts for the packets of the LBO PDU session.

14. The edge network LBO-SGW of claim 12, wherein the one or more processors, or logic, is further configured to:
send a subscription request to the PGW for receiving policy updates for the LBO PDU session; and
receive, from the PGW in response to the subscription request, an HTTP stream that includes policy updates for application, by the edge network LBO-SGW, to the LBO PDU session.

15. A non-transitory storage medium storing instructions executable by an edge network local breakout (LBO) serving gateway LBO-SGW residing within an edge network, wherein the instructions comprise instructions to cause the edge network LBO-SGW to:
receive, from a Radio Access Network (RAN) via the edge network, packets for a LBO Protocol Data Unit (PDU) session associated with a mobile subscriber, wherein the edge network LBO-SGW, via the edge network, connects to a mobile core network, the RAN, at least one multi-access edge computing (MEC) data center, and a first network comprising at least one of a local area network, a wide area network, a metropolitan area network or a public network;
send, based on receipt of the packets for the LBO PDU session, a request for charging via the edge network and through the mobile core network to a Packet data network Gateway (PGW) of the mobile core network;
route and forward the packets for the LBO PDU session via the edge network to a selected one of the first network or the at least one MEC data center without transporting the packets for the LBO PDU session through the mobile core network; and
send charging data counts, for the packets of the LBO PDU session routed and forwarded by the edge network LBO-SGW, via the edge network through the mobile core network to the PGW for reporting to an Online Charging System (OCS) and charging to the mobile subscriber.

16. The non-transitory storage medium of claim 15, wherein the instructions further comprise instructions to cause the edge network LBO-SGW to:
establish the LBO PDU session with the PGW, wherein the LBO PDU session includes policy updates and online charging.

17. The non-transitory storage medium of claim 15, wherein the instructions further comprise instructions to cause the edge network LBO-SGW to:
send a subscription request to the PGW for receiving policy updates for the LBO PDU session from a Policy and Charging Rules Function (PCRF).

18. The non-transitory storage medium of claim 17, wherein the instructions further comprise instructions to cause the edge network LBO-SGW to:
receive, from the PCRF via the PGW in response to the subscription request, policy updates for the LBO PDU session; and
apply the received policy updates to the LBO PDU session.

19. The non-transitory storage medium of claim 15, wherein the instructions further comprise instructions to cause the edge network LBO-SGW to:
establish, between the edge network LBO-SGW and the PGW, a HyperText Transfer Protocol (HTTP) client/server relationship.

20. The non-transitory storage medium of claim 15, wherein the instructions to cause the edge network LBO- SGW to send the charging data counts to the PGW further comprise instructions to cause the edge network LBO-SGW to:

send, to the PGW, an HTTP stream that includes the charging data counts for the packets of the LBO PDU session.

21. The non-transitory storage medium of claim 15, wherein the instructions further comprise instructions to cause the edge network LBO-SGW to:

send a subscription request to the PGW for receiving policy updates for the LBO PDU session; and receive, from the PGW in response to the subscription request, an HTTP stream that includes policy updates for application, by the edge network LBO-SGW, to the LBO PDU session.

* * * * *